US006863356B2

(12) United States Patent
Hackl et al.

(10) Patent No.: US 6,863,356 B2
(45) Date of Patent: Mar. 8, 2005

(54) DEVICE AND METHOD FOR OPERATING A MOTOR VEHICLE

(75) Inventors: Matthias Hackl, Vaihingen (DE); Wolfgang Kraemer, Ingolstadt (DE); Rainer Muenz, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/169,292

(22) PCT Filed: Oct. 20, 2001

(86) PCT No.: PCT/DE01/04029

§ 371 (c)(1),
(2), (4) Date: Oct. 21, 2002

(87) PCT Pub. No.: WO02/34599

PCT Pub. Date: May 2, 2002

(65) Prior Publication Data

US 2003/0122417 A1 Jul. 3, 2003

(30) Foreign Application Priority Data

Oct. 28, 2000 (DE) ........................ 100 53 604

(51) Int. Cl.[7] .............................................. B60D 6/00
(52) U.S. Cl. ..................................... 303/146; 303/149
(58) Field of Search .............................. 303/146, 147, 303/148, 149

(56) References Cited

U.S. PATENT DOCUMENTS 4,566,710 A * 1/1986 Furukawa et al. .......... 180/410
4,998,593 A * 3/1991 Karnopp et al. ............ 180/408
5,035,295 A * 7/1991 Leiber et al. ............... 180/415
5,089,967 A * 2/1992 Haseda et al. ............... 701/78
5,316,379 A * 5/1994 Becker et al. .............. 303/140
5,482,133 A * 1/1996 Iwata et al. ................ 180/197
6,085,860 A * 7/2000 Hackl et al. ................ 180/443
6,453,226 B1 * 9/2002 Hac et al. .................... 701/48

FOREIGN PATENT DOCUMENTS

DE 40 31 316 4/1992
EP 0 487 967 6/1992

OTHER PUBLICATIONS

A. Van Zanten et al., "FDR—The Operating Dynamics Regulation of Bosch," Journal of Automobile Technology, vol. 96, 1994, pp. 674–689.

F. Hecker et al., "Vehicle Dynamics Controller for Commercial Vehicles," SAE Technical Paper Series 973184.

* cited by examiner

Primary Examiner—Matthew C. Graham
(74) Attorney, Agent, or Firm—Kenyon & Kenyon (57) ABSTRACT

Device and method are described for operating a vehicle using a vehicle controller to individually adjust braking forces of the wheels of at least one axle of the vehicle and using a yawing moment compensator to at least partially compensate for a yawing moment of the vehicle resulting from different braking forces of individual wheels of at least one axle by intervening in a steering of the vehicle, the action of the yawing moment compensator on the steering not being performed or only to a lesser degree while the vehicle controller is adjusting braking forces.

36 Claims, 7 Drawing Sheets

DEVICE AND METHOD FOR OPERATING A MOTOR VEHICLE

FIELD OF THE INVENTION

The present invention relates to a device and a method for operating a vehicle using a vehicle controller for individually adjusting braking forces of the wheels of at least one axle of the vehicle and using a yawing moment compensator to at least partially compensate for a yawing moment of the vehicle due to different braking forces of individual wheels of the at least one axle by intervening in a steering of the vehicle.

BACKGROUND INFORMATION

Today, braking systems such as hydraulic, electrohydraulic, pneumatic, electropneumatic, or electromechanical braking systems may be increasingly electrically controllable. The electrical control may permit a pressure build-up in the wheel brakes independent of the driver's braking intent, i.e. of the brake pedal operation by the driver. Such electrical controls of braking systems may be used, for example, for implementing an anti-lock control (ABS, i.e., anti-lock (braking) system) or an electronic stability program (FDR or ESP).

A purpose of an anti-lock (braking) system (ABS) may include to prevent the vehicle from slipping due to its wheels locking while braking, in particular on a slippery surface. For this purpose, when the driver operates the brake pedal for an extended period of time, sensors determine whether the individual wheels are locked, and whenever this is the case, the brake pressure on the corresponding wheel brakes is reduced. In such an anti-lock (braking) system, the front wheels of the vehicle may be (but not necessarily) separately and consequently differently controlled, while the rear wheels are controlled together.

An electronic stability program (FDR or ESP) is used to monitor steering, braking, and gas pedal inputs by the driver in order to prevent the vehicle from slipping as a result of false inputs. In this context, false inputs are intercepted by targeted braking actions at the individual wheels.

Similar to braking systems controlled by electrical controls, steering systems may also be controlled by motor-driven steering systems. In this context, the power of a power source of an electromotor, for example, is able to be superimposed on the steering-wheel power applied by the driver, e.g. using a control element for the superimposed steering action. On the one hand, an effect supporting the steering-wheel power of the driver is able to be achieved. On the other hand, steering signals that increase the driving safety and/or the driving comfort are able to be applied to the steering systems of the vehicle. Such a motor-driven steering system is described in German Published Patent Application No. 40 31 316, for example.

A combination of a control of a braking system and of a steering system of a vehicle is described in European Published Patent Application No. 0 487 967 (vehicle having an anti-lock controller). Reference is made to this patent with respect to the entire content. In short, a yawing moment compensation (GMK) for a vehicle equipped with an anti-lock (braking) system (ABS) is described in European Published Patent Application No. 0 487 967. The yawing moment compensation determines a correction steering angle to compensate for the yawing moment of the vehicle occurring when braking on an inhomogeneous roadway (e.g. a $\mu$-split) due to different braking forces on the left or right wheel(s).

SUMMARY

An object of the present invention may include providing an improved method and an improved device for controlling a braking system and a steering system of a vehicle as well as providing a vehicle having the corresponding device.

This objective may be achieved by an example method according to the present invention. In this context, for operating a vehicle using a vehicle controller to individually adjust braking forces of the wheels of at least one axle of the vehicle and using a yawing moment compensator to at least partially compensate for a yawing moment of the vehicle resulting from different braking forces of individual wheels of at least one axle by intervening in a steering of the vehicle, the action of the yawing moment compensator on the steering is not performed or only to a lesser degree while braking forces are being adjusted by the vehicle controller.

Hence, the action of the yawing moment compensator on the steering is not performed while the vehicle controller is active.

In particular, the vehicle controller may be part of an electronic stability program (FDR or ESP) as described, for example, in the article, FDR—The Operating Dynamics Regulation of Bosch, by A. van Zanten, R. Erhardt and G. Pfaff, Journal of Automobile Technology 96 (1994), 11 pages 674 to 689, and SAE paper 973184, Vehicle Dynamics Controller for Commercial Vehicles, by F. Hecker, S. Hummel, O. Jundt, K. -D. Leimbach, I. Faye, and H. Schramm. In this context, the vehicle controller may be configured for adjusting the braking forces as a function of the yaw rate of the vehicle and a setpoint yaw rate of the vehicle, in particular as a function of the difference between the yaw rate of the vehicle and the setpoint yaw rate of the vehicle. In this context, the braking forces may be adjusted by calculating the setpoint slip values for the wheels that may be input quantities in secondary control loops.

The intervention of the yawing moment compensator in the steering may be reduced by at least one filter.

In a further example embodiment of the present invention, the axle may be the front and/or the rear axle.

In another example embodiment of the present invention, the action on a steering of the vehicle may be performed using a compensation steering angle determined as a function of the braking forces of individual wheels.

In a further example embodiment of the present invention, a compensation steering angle dependent on a difference of separately controlled braking pressures of the front and/or rear wheels may be adjusted at a rear-wheel steering system or may be superimposed on a front-wheel or rear-wheel steering angle in order to at least partially compensate for the yawing moment of the vehicle.

In this context, the braking pressures may be used as substitute quantities for the braking forces.

In another example embodiment of the present invention, the value of the compensation steering angle may be set to zero in a predefined or variable range of small braking pressure differences, i.e. within a dead zone, and to a value not equaling zero outside of the dead zone.

The values for the dead zone may be different for the front and rear axle.

In another example embodiment of the present invention, separate partial compensation steering angles may be determined in each case for the front wheels and the rear wheels, the compensation steering angle being determined as a function of the partial compensation steering angles.

In a further example embodiment of the present invention, the compensation steering angle may be determined by adding the partial compensation steering angles.

In another example embodiment of the present invention, at least one partial compensation steering angle may be determined after the dead zone is exceeded by adding the product of a constant and the initial value of the dead zone and the product of a variable amplification and the initial value of the dead zone.

In a further example embodiment of the present invention, the compensation steering angle may be stored when braking forces are adjusted by the vehicle controller.

In another example embodiment of the present invention, the stored compensation steering angle may be essentially continuously transferred after the completion of the adjustment of the braking forces via the vehicle controller to an instantaneous compensation steering angle.

DETAILED DESCRIPTION

In the following, a technical field, which may be improved by an example embodiment of the present invention, is first explained via an example on the basis of FIGS. 1 through 5. An example embodiment of the present invention is then described on the basis of FIGS. 6 and 7.

Figure 1:
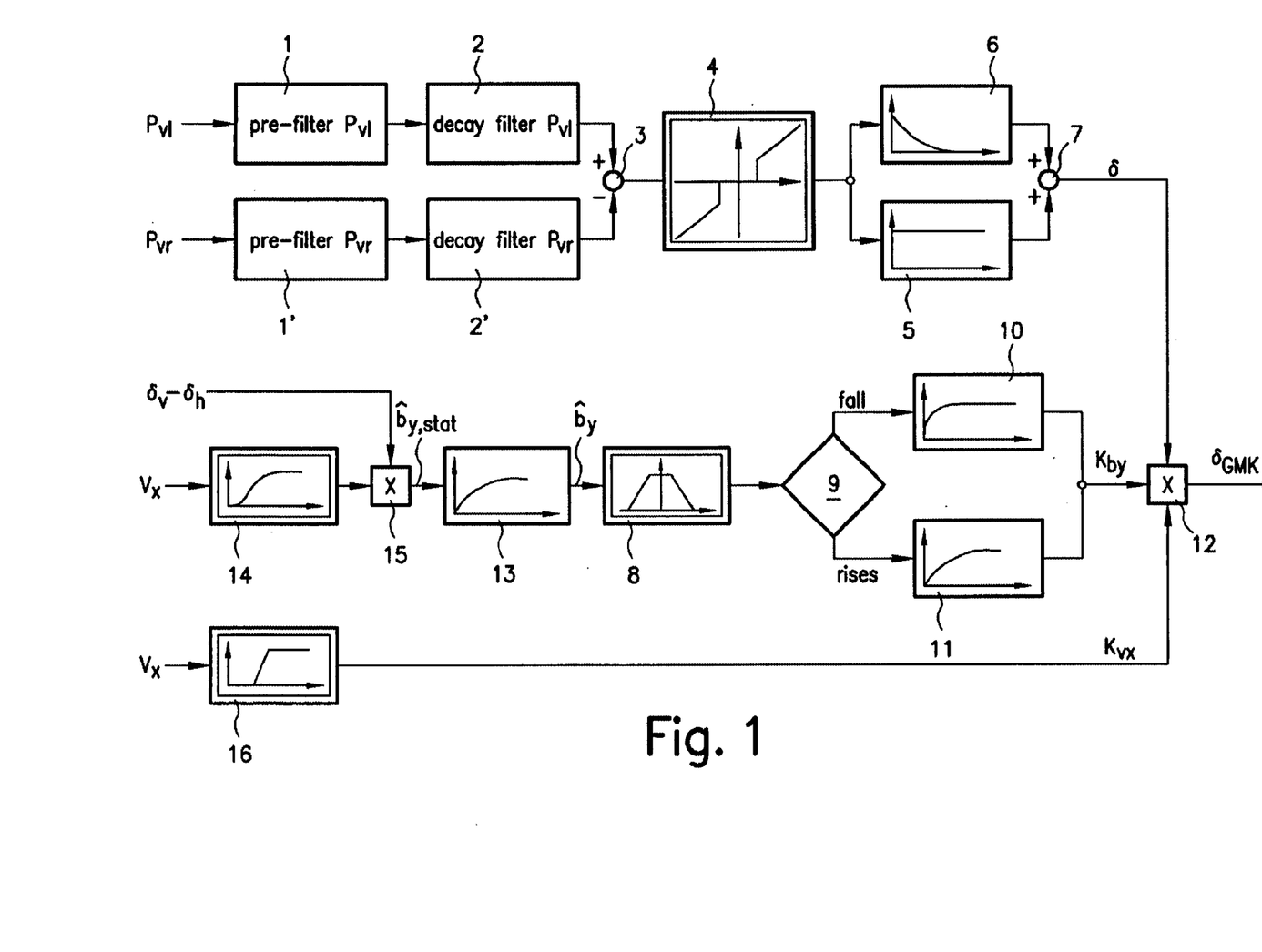
FIG. 1 is a block diagram of a technical field that may be improved by an example embodiment of the present invention.

The present example of a technical field in FIG. 1 explains the compensation for the brake yawing moment by a rear axle steering for a select-low braked rear axle.

The braking pressures in the front wheels supply, in a first approximation, a measure of the used braking force, the difference $\Delta p$ of the pressures consequently supplies a measure for the brake yawing moment. Rear-axle steering angle $\delta$ produces an opposing moment about vertical vehicle axle that compensates for the brake yawing moment given a suitable configuration. The steady-state relationship between $\delta$ and $\Delta p$ is described by proportionality factor $k_p$.

Since the brake pressures may be constantly modulated during an ABS braking, a rear axle steering control having only the abovementioned proportionality may react very irregularly. Therefore, a filtering may be provided before the pressure difference is calculated. This difference first overcomes a significant threshold (dead zone) before the control becomes active; this measure may also be intended to prevent steering irregularity in the case of small disturbances.

Measured braking pressures $P_{vl}$ and $P_{vr}$ are filtered in two stages.

Disturbances caused by measuring noise (peaks, A/D errors) are to be suppressed in pre-filter 1, 1' by variably restricting the pressure change rate. The increase limit remains at smaller values when there is frequent change of pressure build-up and decrease. Given a change having the same sign over a longer period of time, the increase limit is continuously increased to a maximum value.

Decay filters 2 and 2' may be configured for the relationships between ABS control cycles (ABS control cycles with series of pulses) and rear-wheel steering. So that the rear-wheel steering angle does not directly follow the pressure jumps in particular in the pressure reduction phases, a decrease of the filtered braking pressures is only allowed very slowly during the first pressure reduction after a pressure increase phase. After a predefined time (e.g. 100 ms) elapses, the time constant of the low pass filter is switched over so that the filtered value (output of block 2 or 2') approaches the output quantities of pre-filter 1 (1') more quickly.

Figure 2:
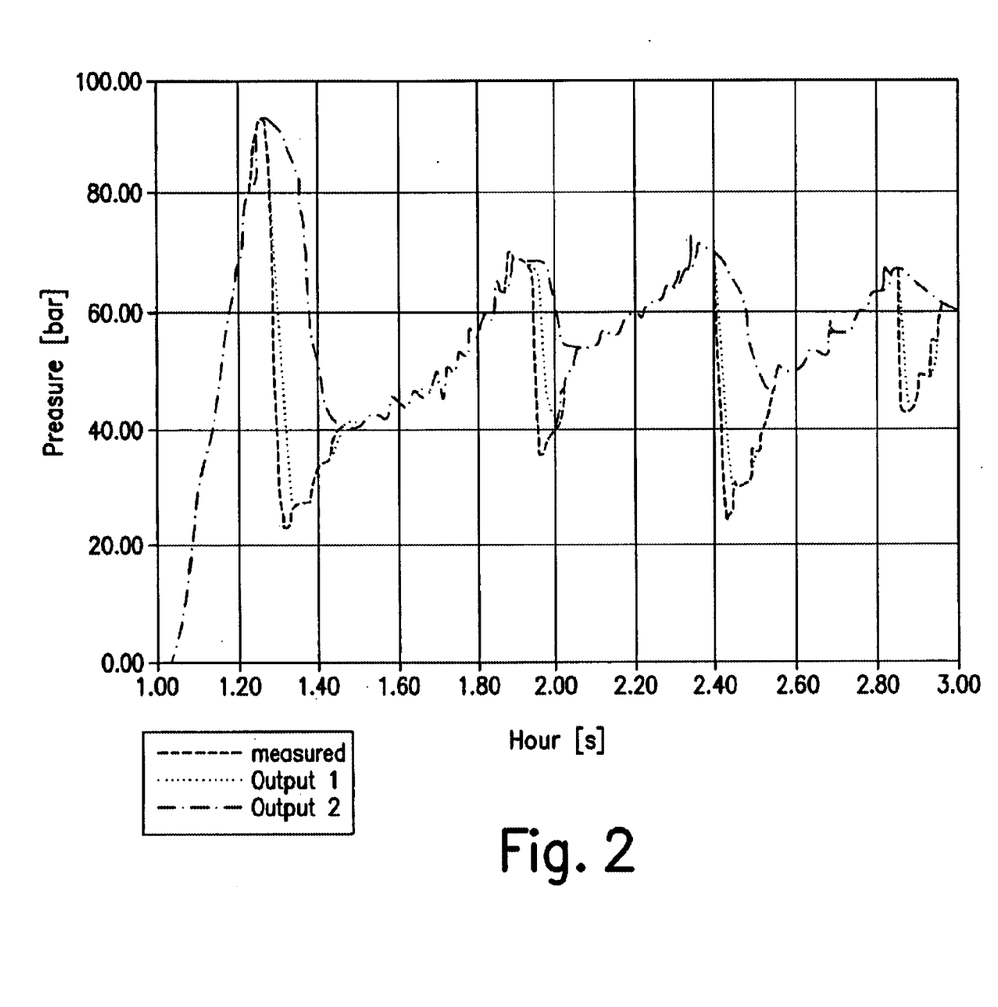
FIG. 2 is a graph diagram for the block diagram in FIG. 1.

The measured pressure as well as the intermediate value and the filtered pressure are shown in FIG. 2.

According to this, the difference of the output quantities of filters 2 and 2' is formed from filtered braking pressures $P_{vlf}$ and $P_{vrf}$ in a subtracter circuit 3, the difference supplying after a dead zone 4 is exceeded input quantities $f(\Delta p)$ for control amplifiers 5 and 6 whose output signals are added in adder 7 to form steering angle $\Delta$.

The control may be made up of a constant proportion $$\delta_p = f(\Delta p) \cdot k_p \text{ (Block 5)}.$$

As a result of the filtering, the dead zone, and the dynamic response (characteristic) of the steering controller, a yawing motion first builds up which is also maintained in the case of an ideal configuration of amplification $k_p$. Therefore, a time-variable proportion is also calculated at the start of the control action:

$$\delta_v = f(\Delta p) \cdot k_v \text{(Block 6)}$$

Factor $k_v$ is set to a certain value when the difference of the filtered pressures exceeds the dead zone and then continually decays.

Therefore, when the control is switched in, the rear-wheel steering angle is noticeably increased, so that the yaw rate changes its sign and the yaw angle is consequently reduced again. In this case, the driver may no longer need to intervene. Viewed over the entire braking action, the yaw rate only assumes very small values, i.e., the irregularities are largely compensated for by the ABS control cycles.

The yawing moment compensation prevents the vehicle from breaking away at low speeds as well as at high speeds. Its support may become clearer as the speed increases.

In tests with a fixedly held steering wheel, the track displacement remains quite small, and a yaw angle builds very slowly.

As already said above, the measurement used to date of the front wheel brake pressures may also be replaced by an estimation algorithm. One is described in patent application P 4030724.7, which is included in European Published Patent Application No. 0 486 967 as an appendix. In this context, the filtering of the braking pressures is able to be simplified such that blocks 1, 1' are eliminated.

The front-wheel steering angle may be influenced according to the same principle. Only quantitative differences arise.

Given different friction coefficients on different vehicle sides, introducing the time-variable amplification may result in desirable features yet may cause an oversteering behavior of the vehicle when fully braking in a curve. To prevent this, the transversal acceleration of the vehicle may also be taken in to account. However, considering the transversal acceleration as described does not presuppose acquiring the steering angle according to the top branch in FIG. 1.

Figure 3:
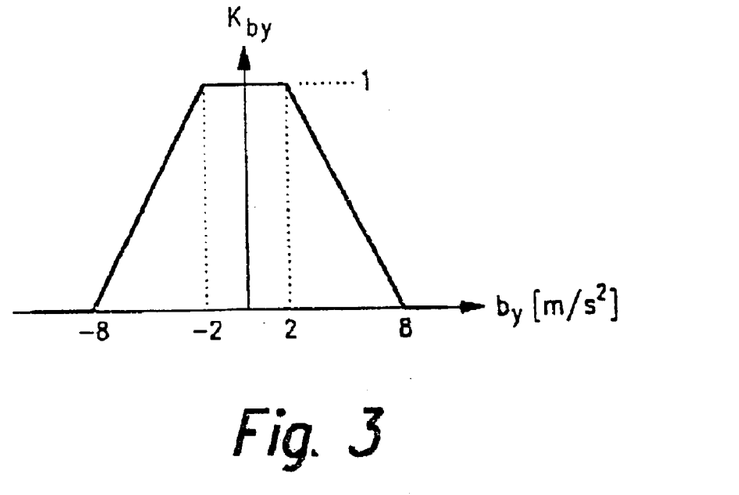
FIG. 3 is a graph diagram for the block diagram in FIG. 1.

A correction factor $K_{by}$, which is multiplicatively linked to the rear-wheel angle (in 12), is first determined from measured transversal acceleration $b_y$ via the characteristic curve (block 8) shown in FIG. 3.

This characteristic curve causes the compensation to not be influenced ($K_{by}=1$) in the case of low transversal accelerations, e.g. less than 2 m/s², thereby resulting in a reduction proportional to the transversal acceleration, and causes the compensation to be completely suppressed ($K_{by}=0$) in the case of a very high transversal acceleration, e.g. above 8 m/s². This characteristic curve is based on the knowledge that in the case of μ-split braking, the occurring transversal accelerations are approximately in the range of +/−2 m/s².

Only this characteristic curve may not be sufficient. Fluctuations in the transversal acceleration for values $b_y > 2$ m/s² (e.g. sign change of $b_y$ during lane change while braking) result in proportional fluctuations of the correction factor and consequently of the rear-wheel steering angle that may be noticeable as an irregularity. In addition, it may be undesirable that these steering-angle fluctuations then effect the $b_y$ signal. A suitable filtering of the correction factor may therefore be required. However, it may be required to ensure that when building up a transversal acceleration, the GMK is quickly reduced. However, during certain driving maneuvers, e.g. lane changes, an intervention may not be performed again too quickly. This may be achieved using two alternative low pass filters 10 and 11 having very different time constants. As such, the transversal acceleration-dependent steering angle correction may have the form shown in FIG. 1 in blocks 8, 9, 10, and 11.

Example values for the time constants of the two alternative low pass filters may be 10 ms and 1000 ms, respectively.

Blocks 9, 10, and 11 are to symbolize the following situation. If the transversal acceleration increases and $Kb_y$ becomes smaller, low pass filter 10 having the small time constant becomes active, i.e., output value $Kb_y$ quickly follows the input from block 8 and decreases the steering angle. If however the transversal acceleration decreases and $Kb_y$ consequently increases, $Kb_y$ follows the input value from block 8 but in a delayed manner.

These measures may reduce the yawing moment compensation when braking on curves and changing lanes while braking on surfaces having high coefficients of friction. The remaining portions of rear-wheel steering angle $\delta_{GMK}$ from the compensation may no longer have a negative effect on the vehicle performance.

The measured transversal acceleration may be replaced by a quantity subsequently formed from the steering angles and the vehicle speed (e.g. tacho signal). When considered in a steady-state manner, the following relationship for the transversal acceleration is able to be derived from the conventional linear single-track model:

$$b_{y,stat} = \frac{V_x^2(\delta_v - \delta_h)}{l_o} \frac{1}{1+(V_X/V_{ch})^2}$$

where:

| $V_x$ | longitudinal vehicle speed |
| $\delta v$ | front-wheel steering angle |
| $\delta h$ | rear-wheel steering angle |
| $l_o$ | wheel base |
| $V_{ch}$ | characteristic speed |
| $B_{y,stat}$ | estimated steady-state acceleration |

In this context $V_{ch}$ is made up of the model parameters as follows:

$$V_{ch} = \sqrt{\frac{1}{\frac{m}{l_0^2}\left(\frac{l_h}{C_v} - \frac{l_v}{C_h}\right)}}$$

where

| m | Vehicle weight |
| $l_v$ | Distance from center of gravity - front axle |
| $l_h$ | Distance from center of gravity - rear axle |
| $C_v$ | Slip angle rigidity - front axle |
| $C_h$ | Slip angle rigidity - rear axle |

Using the parameters of a certain model may result in a value of $V_{ch}$ of about 20 m/s.

In the case of a transient driving maneuver (changing lanes while braking), it turns out that steady-state equation (1), which is adjusted to cornering, may deliver transversal accelerations that are too high. For this reason, a dynamic member (low pass filter having time constant $T_{bys}$), which takes the vehicle dynamics into consideration, is connected in series (block 13).

When implementing equation (1) in the computing device, it offers itself to store the portion $$\frac{V_x^2}{l_o} \frac{1}{1+(V_X/V_{ch})^2}$$

as a speed-dependent characteristic curve (block 14). Equation (1) is consequently reduced to the interpolation of a characteristic curve (in block 14) as well as the multiplication of the result by the difference $(\delta_v-\delta_h)$ (in block 15). The total transversal acceleration correction consequently may have the form shown in the middle branch in FIG. 1.

When estimating the transversal acceleration as shown above, rear-wheel steering angle $\delta_h$ is included as an input quantity. At the same time, the estimation has a reciprocal effect on part of the rear-wheel steering angle, namely the GMK part. So that no feedback effects are able to occur in this context, only the portion of the rear-wheel steering angle coming from another rear-wheel steering control is taken into consideration as an input quantity of the transversal acceleration estimation.

To suppress the amplified turning-in at the end of a curve braking by the yawing moment compensation, an amplification factor $K_{Vx}$ dependent on the vehicle speed is multiplicatively superimposed.

Figure 4:
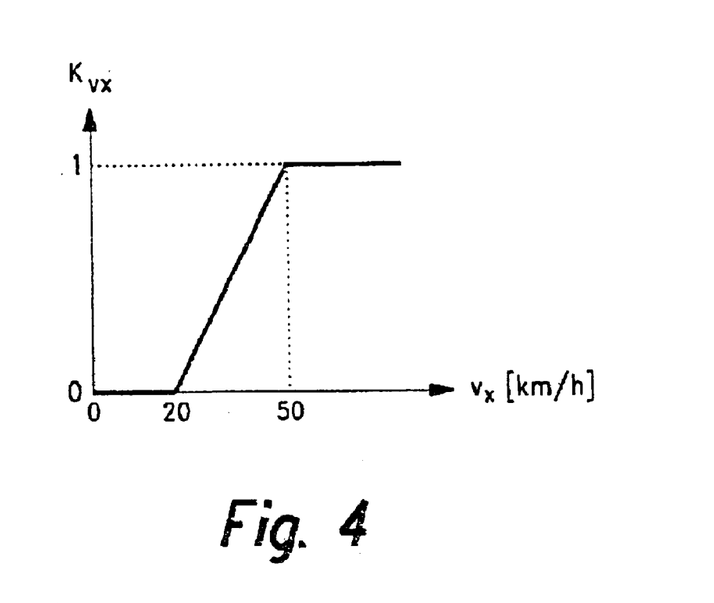
FIG. 4 is a graph diagram for the block diagram in FIG. 1.

Its example characteristic curve is stored in block 16 and shown in FIG. 4. Over 50 km/h, for example, the amplification factor remains unchanged at one, and in the range of 50 km/h to 20 km/h, for example, it is continuously reduced to zero. This measure may be less important for μ-split braking, since vehicles having ABS may not show any manageability problems in lower speed ranges.

This additional factor $K_{V_x}$ is multiplicatively considered in multiplier 12. Therefore, the steering angle for the yawing moment compensation as a whole is:

$$\delta_{GMX} = K_{by} \cdot K_{vx} \cdot \delta.$$

Figure 5:
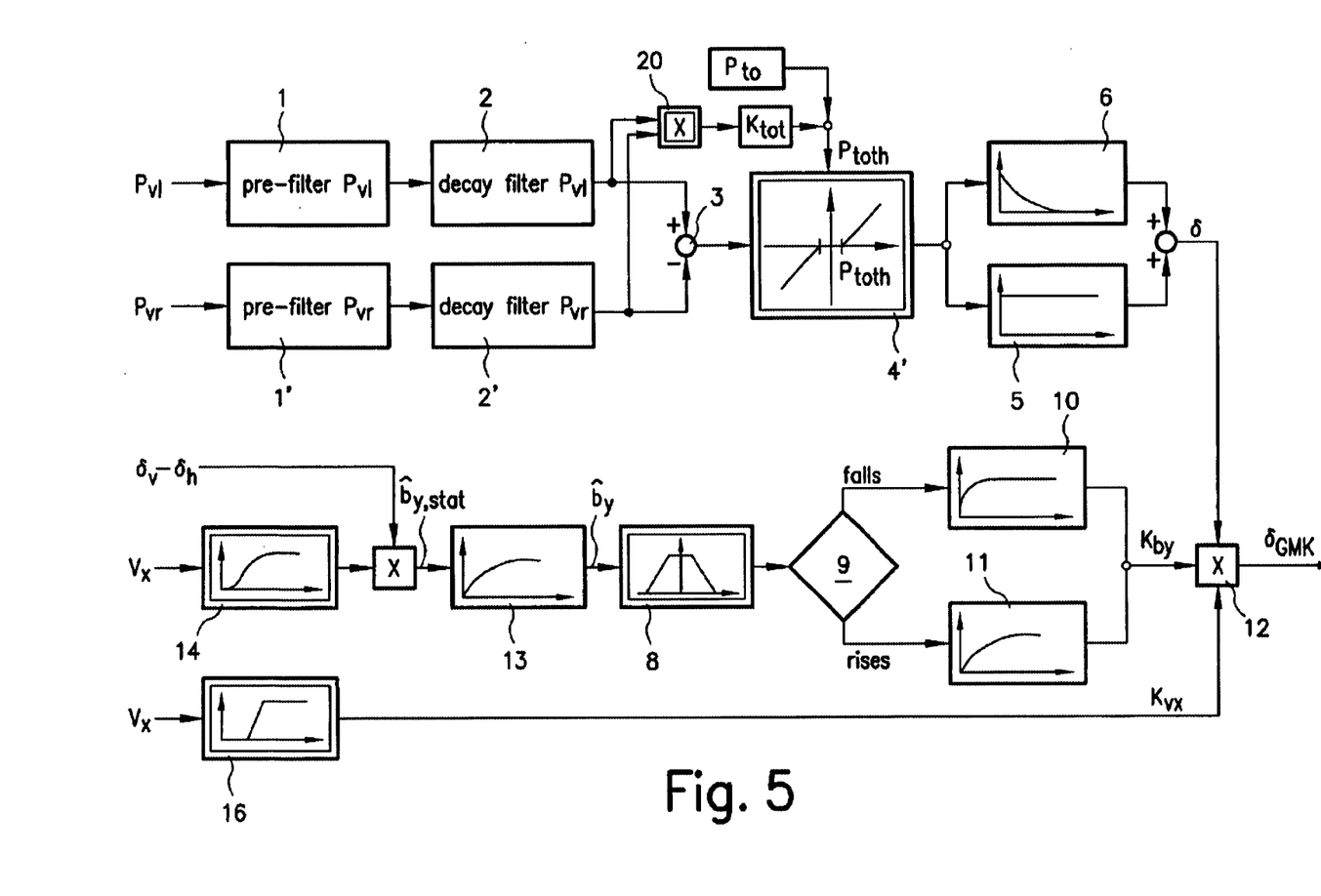
FIG. 5 is a block diagram of a modified technical field that may be improved by an example embodiment of the present invention.

A variable dead zone 4' differentiates the block diagram of a modified technical field in FIG. 5 from that in FIG. 1. In this context, filtered braking pressures $P_{vlf}$ and $P_{vrf}$ are multiplied together by a multiplier 20. The product of $P_{vlf}$ and $P_{vrf}$ is multiplied by a correction factor $K_{th}$ and added to a predefined limiting value $P_{to}$ to form a corrected limiting value $P_{toth}$.

The example of a technical field described using FIGS. 1 through 5 that may be improved by an example embodiment of the present invention starts out from a vehicle having an anti-lock (braking) system (ABS) in which the braking pressures of the rear wheels are not individually regulated. This may often be sufficient for the purposes of a simple anti-lock (braking) system (ABS) so that provision may not be made for an individual control of the braking pressures of the rear wheels for commercially available anti-lock (braking) systems (ABS). Consequently, braking pressure differences may only occur at the wheels of the front axle and may only need to be considered there.

Something different may be true for vehicles equipped with an electronic stability program (FDR or ESP). In this instance, within the framework of the electronic stability program, braking pressures of the wheels of both axles may be individually regulated at least intermittently. In this context, different braking pressures may be set in a targeted manner at each wheel of an axle in order to influence the vehicle motion.

Figure 6A:
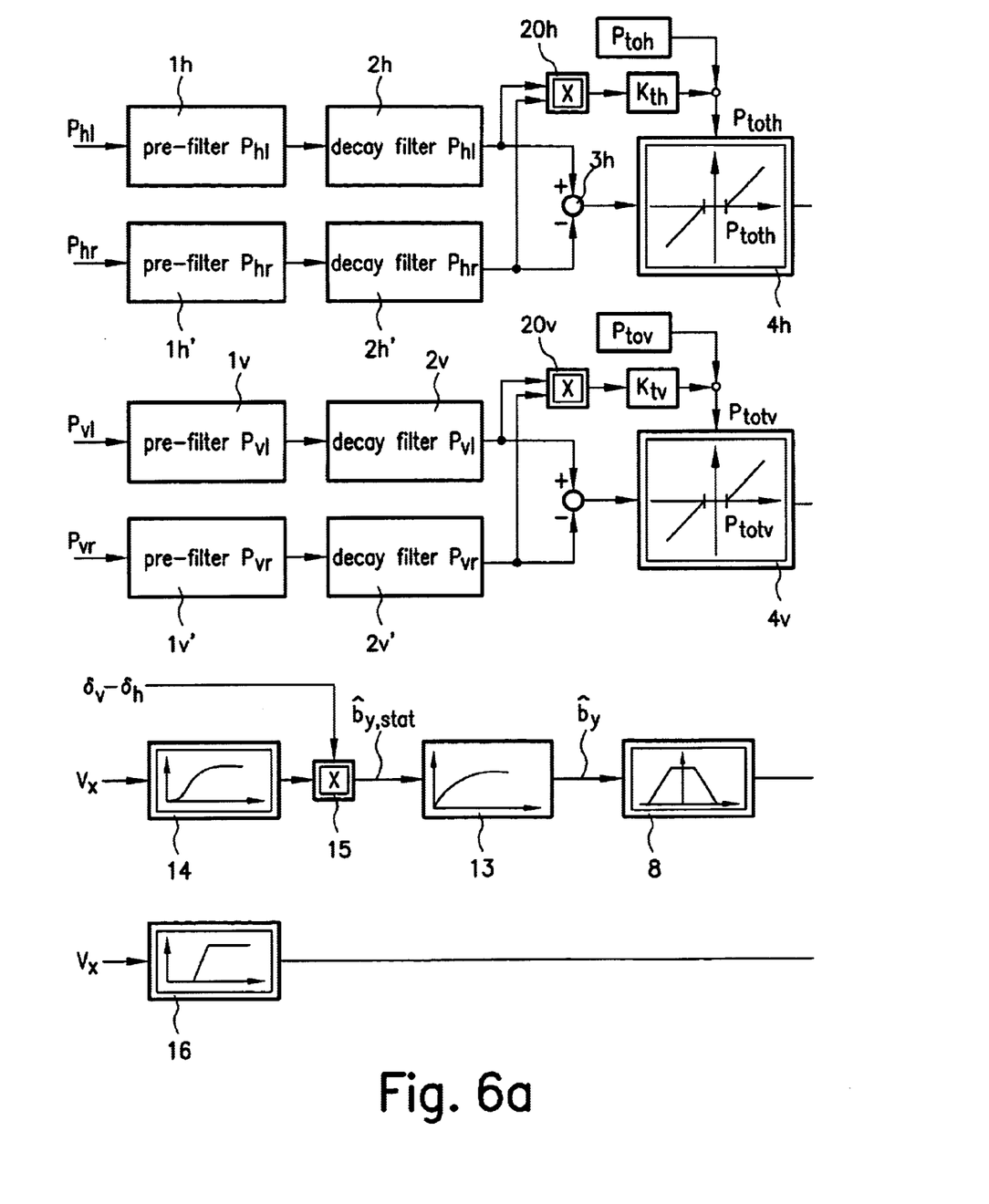
FIG. 6 is a block diagram of an example embodiment of the present invention.
Figure 6B:
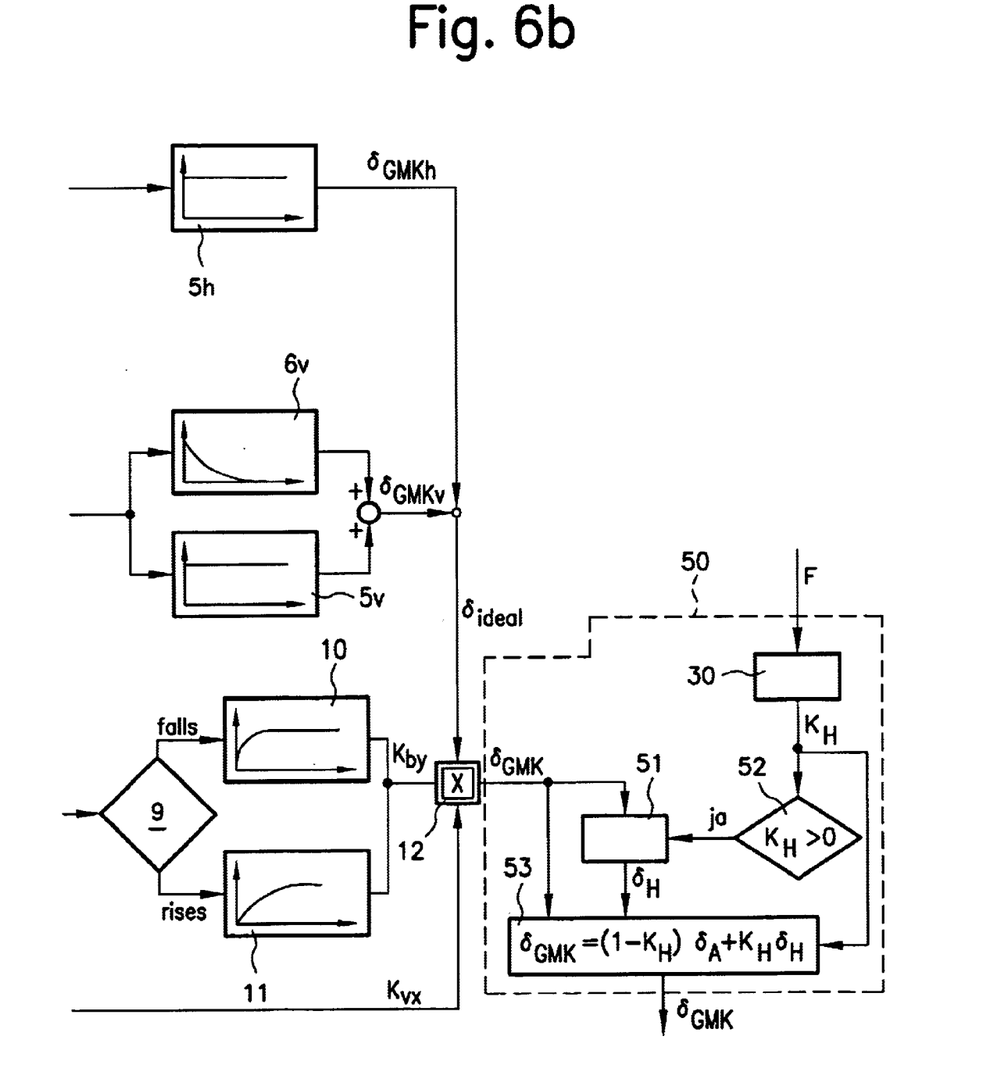
Figure 7:
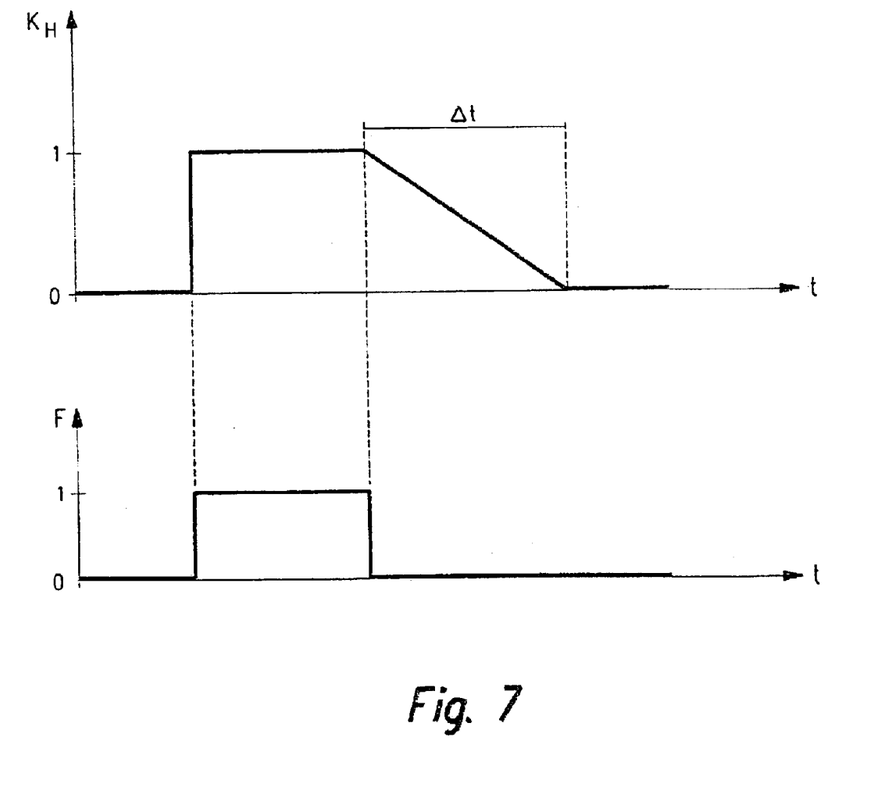
FIG. 7 is a diagram of the example embodiment in FIG. 6.

These conditions are considered in the example embodiment of the present invention shown in FIG. 6. In this context, the variant from FIG. 5 having a variable dead zone 4' is presupposed. The present invention may also be used for the variant from FIG. 1 having a fixed dead zone. In this manner, it may be achieved that yawing moment compensation (GMK) only reacts to braking pressure differences in an anti-lock braking system (ABS) and may not also be dependent on a vehicle controller of a electronic stability program (FDR or ESP).

In comparison with the variant in FIG. 5, yawing moment compensation (GMK) is expanded in FIG. 6 by two parts:

The first expansion, which is shown in the upper left portion of FIG. 6, is used for considering the braking pressure differences of the wheels of the rear axle. For this purpose, another branch was added to the block diagram that may correspond to the top branch in FIG. 5 (or FIG. 1). Therefore, the same components in the representation are designated by the same reference numerals, and only "h" for the rear axle and "v" for the front axle were added.

The braking pressures of rear wheels $P_{hl}$ and $P_{hr}$ are able to be measured or estimated as described above for the braking pressures of front wheels $P_{vl}$, $P_{vr}$. They may then be treated in the same manner as the braking pressures of front wheels $P_{vl}$, $P_{vr}$. Consequently, they are filtered in pre-filters and decay filters $1_h$, $1_h'$, $2_h$, $2_h'$. The difference of filtered braking pressures $P_{hlf}$, $P_{hrf}$ is determined in a subtracter circuit $3_h$. If the difference of filtered pressures $P_{hlf}$, $P_{hrf}$ exceeds a dead zone 4, which is dependent on the total pressure level or is predefined in a fixed manner, a partial compensation steering angle $\delta_{GMKh}$ is determined. A steering angle determined from the braking pressures of the wheels of the front axle as described above is added as an additional partial compensation steering angle $\delta_{GMKv}$ to partial compensation steering angle $\delta_{GMKh}$ of the braking pressures of the wheels of the rear axle to form a rear and/or front axle steering angle $\delta_{ideal}$.

Mainly the following points differentiate the treatment of braking pressures $P_{hl}$, $P_{hr}$ of the rear wheels from the treatment of braking pressures $P_{vl}$, $P_{vr}$ of the front wheels: Other parameters may be selected for the filters and the dead zone as well as another value for the constant amplification. Such different parameters may take into account e.g. the different configuration or the different size of the brakes, i.e., a different connection between braking pressure and braking force at the front or rear axle. Furthermore, such different parameters may take into account a possibly different track width of the front and rear axle or different ABS strategies.

Moreover, the time-variable amplification of the braking pressure difference (block 6 in FIGS. 1 and 5) may be eliminated. This may be possible since in the case of an ABS action within a electronic stability program (FDR), the braking pressure difference of the rear wheels is regularly controlled such that it only increases slowly. On the other hand, a time-variable amplification of the braking pressure difference of the rear wheels may also be useful and used accordingly.

Due to the indicated differences when treating the rear and front braking pressures $P_{hl}$, $P_{hr}$, and $P_{vl}$, $P_{vr}$, it may be desirable to first form each difference separately as shown in FIG. 6. Subsequently, partial compensation steering angles $\delta_{GMKv}$, $\delta_{GMKv}$ are added to form total rear or front axle steering angle intervention $\delta_{ideal}$.

The thus obtained rear or front axle steering angle intervention $\delta_{ideal}$ may generally correspond to the steering angle for the yawing moment compensation. However, as described above, transversal acceleration $b_y$ and the speed of the vehicle may also be considered. For this purpose, specified correction factors $K_{by}$ and $K_{vx}$ are applied to front or rear axle steering angle $\delta_{ideal}$. The thus obtained instantaneous compensation steering angle $\delta_A$ is set for yawing moment compensation at the rear axle or is superimposed on a steering angle of the front or rear axle.

The second expansion may be used to ensure that yawing moment compensation (GMK) only reacts to braking pressure differences from an anti-lock braking system (ABS) and not as a function of a driving dynamics controller. A signal indicating when interventions of the vehicle controller occur is provided for this purpose. The feature that interventions of the vehicle controller exist may be indicated in electronic stability programs in the form of a flag that is able to assume the values zero and one, for example. Therefore, it may only need to be transmitted to the control of yawing moment compensation (GMK). A selector 50 is provided for processing signal F.

This expansion may cause yawing moment compensation (GMK) to be switched off when interventions of the vehicle controller occur. An already applied compensation steering angle $\delta_A$ is maintained during a subsequent intervention of the vehicle controller and is then essentially continuously transferred to an instantaneous compensation steering angle $\delta_A$.

For this purpose, a factor $K_H$ is first formed from flag F of the vehicle controller via a block 52 by a switching-off filter 30. The value of factor $K_H$ always equals one when flag F is set, i.e. equals one. If flag F zeros, the value of factor $K_H$ tends to zero with a predefined time response. Such a relationship is shown via an example in FIG. 7. In this example, the value of factor $K_H$ tends to zero in a linear manner in a time $\Delta t$. Alternatively, an exponential transition may also be used.

With the help of thus obtained factor $K_H$, the front-axle steering angle $\delta_{GMK}$ to be ultimately applied at the steered axle for yawing moment compensation is determined by a block 53 in accordance with the following equation:

$$\delta_{GMK}=(1-K_H)\cdot\delta_A+K_H\cdot\delta_H$$

where

| | |
|---|---|
| $\delta_A =$ | the intantaneous compensation steering angle in each case |
| $\delta_H =$ | a compensation steering angle maintained during an intervention of the vehicle controller. |

A controllable sample-and-hold member 51 is used to obtain constant compensation steering angle $\delta_H$. It is switched such that it assumes in each case instantaneous compensation steering angle $\delta_A$ (sample). As long as factor $K_H$ equals zero, sample-and-hold member 51 also outputs this instantaneous compensation steering angle $\delta_A$ in each case as an output value (i.e. $\delta_A=\delta_H$). However, as soon as factor $K_H$ is greater than zero, the value of compensation steering angle $\delta_A$ applied last is frozen (hold) and constant compensation steering angle $\delta_H$ is consequently generated and output. As soon as factor $K_H$ again assumes the value zero, constant compensation steering angle $\delta_H$ is no longer maintained, etc.

As long as factor $K_H$ equals zero, i.e., as long as there are no interventions of the vehicle controller, the above equation simplifies to:

$$\delta_{GMK}=(1-0)\cdot\delta_A+0\cdot\delta_H=\delta_A$$

Therefore, the yawing moment compensations required in each case are performed unchanged in accordance with the above description.

As soon as there is an intervention of the vehicle controller, factor $K_H$ equals one. Consequently, the above equation becomes:

$$\delta_{GMK}=(1-1)\cdot\delta_A+1\cdot\delta_H=\delta_H$$

i.e., the compensation angle $\delta_A$ last applied before the intervention of the vehicle controller is maintained as a constant compensation angle $\delta_H$ and continues to be applied during the intervention.

As soon as the intervention of the vehicle controller is finally completed, factor $K_H$ is continuously transferred rear to the value zero during a time $\Delta t$. During this time, constant compensation angle $\delta_H$ continues to be maintained and resulting compensation angle $\delta_{GMK}$ is calculated as explained above:

$$\delta_{GMK}=(1-K_H)\cdot\delta_A+K_H\cdot\delta_H$$

In this manner, the compensation angle $\delta_H$ maintained during the intervention of the vehicle controller and also applied during this time as resulting compensation angle $\delta_{GMK}$ is continuously transferred to the value of the instantaneous compensation angle $\delta_A$ actually needed in each case after the intervention of the electronic stability program (FDR or-ESP) to compensate for the yawing moment.

Another possibility for preventing yawing moment compensation (GMK) from counteracting its vehicle controller is to significantly filter instantaneous intervention angle $\delta_A$ of yawing moment compensation (GMK) as long as the interventions of the vehicle controller are occuring. Consequently, the driving dynamics interventions in the higher frequency range are not affected by yawing moment compensation (GMK).

In comparison with the exemplarily described technical field, the described example embodiment may provide that yawing moment reductions (GMA) to be considered by the anti-lock (braking) system (ABS) integrated in the electronic stability program (FDR or ESP) according to the related art are able to be significantly reduced at the front axle as well as at the rear axle. A transition may also be made to individual ABS interventions at the rear axle already at a higher speed. This may result in a shorter braking distance. Furthermore, other steering actions may superimpose the yawing moment compensation interventions. Measured or estimated braking pressures that may already be available from the electronic stability program (FDR or ESP) may be used as input information for the yawing moment compensation.

The above-described example embodiments are only used to improve the understandability of the present invention. They are not intended as a restriction. Therefore, it may be understood that all additional possible example embodiments are within the framework of the present invention. In particular, it may be understood that the present invention also includes a device for implementing the described method and a vehicle equipped with such a device.

LIST OF REFERENCE NUMERALS $\delta\delta_{ideal}$ Rear-axle and/or front-axle steering angle
$\Delta_A$ Compensation steering angle
$\delta_{GMKv}$, $\delta_{GMKv}$ Partial compensation steering angle
$\Delta P$ Pressure difference
$k_p$ Proportionality factor
$k_v$ Factor
$P_{vl}$, $P_{vr}$ Braking pressures of the front wheels
$P_{vlf}$, $P_{vrf}$ Filtered braking pressures of the front wheels
$P_{hl}$, $P_{hr}$ Braking pressures of the rear wheels
$P_{hlf}$, $P_{hrf}$ Filtered braking pressures of the rear wheels
$b_y$ Transversal acceleration
$K_{by}$ Correction factor
$K_{by}$ Amplification factor
$P_{tot}$ Predefined limiting value
$K_{th}$ Correction factor ,
$P_{toth}$ Corrected limiting value
F Flag
$K_H$ Weight factor
S/H Sample-and-hold member
1,1' Pre-filter
2,2' Decay filter
3 Subtracter circuit
4 Dead zone or dead zone
4' Variable dead zone or dead zone
5,6 Control amplifiers or block
7 Adder
8 Characteristic curve of block
9
10,11 Alternative low pass filters
12 Multiplier
13 Dynamic member
14 Speed-dependent characteristic curve
20 Multiplier
30 Triggering filter

What is claimed is:

1. A method for operating a vehicle, comprising:
  individually adjusting braking forces of wheels of at least one axle of the vehicle using a vehicle controller; and
  using a yawing moment compensator to at least partially compensate for a yawing moment of the vehicle resulting from different braking forces of individual wheels of the at least one axle by determining a steering angle to be applied at a steered axle based on an instantaneous compensation steering angle, a compensation steering angle maintained during an intervention by the vehicle controller, and based on the vehicle controller intervening;

wherein the intervening action is one of not performed and performed to a lesser degree when the vehicle controller is adjusting braking forces.

2. The method according to claim 1, wherein the axle includes at least one of a front axle and a rear axle.

3. The method according to claim 1, wherein the intervening action is performed in the performing step in accordance with a compensation steering angle determined as a function of the braking forces of individual wheels.

4. The method according to claim 3, further comprising the step of storing the compensation steering angle while the vehicle controller is adjusting the braking forces.

5. The method according claim 4, further comprising the step of continuously transferring a stored compensation steering angle to an instantaneous compensation steering angle after the vehicle controller finishes adjusting the braking forces.

6. The method according to claim 1, further comprising the step of one of adjusting at one rear-wheel steering system and superimposing on one of a front-wheel and a rear-wheel steering angle a compensation steering angle to at least partially compensate for the yawing moment of the vehicle, the compensation steering angle dependent on a difference of separately controlled braking pressures.

7. The method according to claim 6, further comprising the step of setting a value of the compensation steering angle to zero within the dead zone and to a non-zero value outside of the dead zone, the dead zone being one of a predefined and variable range of small braking pressure differences.

8. The method of claim 1, wherein the vehicle intervention by the vehicle controller is represented by a factor having a value that depends on whether the vehicle controller is intervening.

9. The method of claim 8, wherein the factor is formed from a signal from the vehicle controller, wherein the signal represent whether the vehicle controller is intervening.

10. The method of claim 8, wherein the factor essentially corresponds to a first value when the vehicle controller is not intervening, and the factor essentially corresponds to another value when the vehicle controller is intervening.

11. The method of claim 10, wherein the steering angle to be applied corresponds to a sum of the instantaneous compensation steering angle and the compensation steering angle maintained while the vehicle controller is intervening, wherein each of the summands is weighted based on the factor.

12. The method of claim 8, wherein the factor essentially corresponds to zero when the vehicle controller is not intervening, and the factor essentially corresponds to one when the vehicle controller is intervening.

13. The method of claim 12, wherein the steering angle to be applied corresponds to a sum of the instantaneous compensation steering angle and the compensation steering angle maintained while the vehicle controller is intervening, wherein the first summand is weighted based on a number that is 1 minus the factor, and the second summand is weighted by the factor.

14. A method for operating a vehicle, comprising:

individually adjusting braking forces of wheels of at least one axle of the vehicle using a vehicle controller;

intervening in a steering operation of the vehicle using a yawing moment compensator to at least partially compensate for a yawing moment of the vehicle resulting from different braking forces of individual wheels of the at least one axle by determining a steering angle to be applied at a steered axle based on an instantaneous compensation steering angle, a compensation steering angle maintained during an intervention by the vehicle controller, and based on the vehicle controller intervening;

determining separate partial compensation steering angles for front wheels and rear wheels; and determining the compensation steering angle as a function of the partial compensation steering angles;

wherein the intervening is one of not performed and performed to a lesser degree when the vehicle controller is adjusting braking forces, and wherein the intervening is performed in the performing step in accordance with a compensation steering angle determined as a function of the braking forces of individual wheels.

15. The method according to claim 14, wherein the compensation steering angle determining step includes the substep of adding the partial compensation steering angles to determine the compensation steering angle.

16. The method according to claim 14, further comprising the step of adding a product of a constant and an initial value of a dead zone and a product of a variable amplification and the initial value of the dead zone to determine at least one partial compensation steering angle, the determination occurring after the dead zone is exceeded.

17. The method of claim 14, wherein the vehicle intervention by the vehicle controller is represented by a factor having a value that depends on whether the vehicle controller is intervening.

18. The method of claim 17, wherein the factor is formed from a signal from the vehicle controller, wherein the signal represent whether the vehicle controller is intervening.

19. The method of claim 18, wherein the factor essentially corresponds to a first value when the vehicle controller is not intervening, and the factor essentially corresponds to another value when the vehicle controller is intervening.

20. The method of claim 19, wherein the steering angle to be applied corresponds to a sum of the instantaneous compensation steering angle and the compensation steering angle maintained while the vehicle controller is intervening, wherein each of the summands is weighted based on the factor.

21. The method of claim 17, wherein the factor essentially corresponds to zero when the vehicle controller is not intervening, and the factor essentially corresponds to one when the vehicle controller is intervening.

22. The method of claim 21, wherein the steering angle to be applied corresponds to a sum of the instantaneous compensation steering angle and the compensation steering angle maintained while the vehicle controller is intervening, wherein the first summand is weighted based on a number that is 1 minus the factor, and the second summand is weighted by the factor.

23. An apparatus for operating a vehicle, comprising:

an adjusting arrangement to adjust braking forces of wheels of at least one axle of the vehicle using a vehicle controller;

an intervening arrangement to intervene in a steering operation of the vehicle using a yawing moment compensator to at least partially compensate for a yawing moment of the vehicle resulting from different braking forces of individual wheels of the at least one axle; and a determining arrangement to determine separate partial compensation steering angles for front wheels and rear wheels, and to determine the compensation steering angle as a function of the partial compensation steering angles, and determining a steering angle to be applied at a steered axle based on an instantaneous compensation steering angle, a compensation steering angle maintained during an intervention by the vehicle controller, and based on the vehicle controller intervening;

wherein the intervening is one of not performed and performed to a lesser degree when the vehicle controller is adjusting braking forces, and the intervening is performed in accordance with a compensation steering angle determined as a function of the braking forces of individual wheels.

24. The apparatus of claim 23, wherein the vehicle intervention by the vehicle controller is represented by a factor having a value that depends on whether the vehicle controller is intervening.

25. The apparatus of claim 24, wherein the factor is formed from a signal from the vehicle controller, wherein the signal represent whether the vehicle controller is intervening.

26. The apparatus of claim 25, wherein the factor essentially corresponds to a first value when the vehicle controller is not intervening, and the factor essentially corresponds to another value when the vehicle controller is intervening.

27. The apparatus of claim 26, wherein the steering angle to be applied corresponds to a sum of the instantaneous compensation steering angle and the compensation steering angle maintained while the vehicle controller is intervening, wherein each of the summands is weighted based on the factor.

28. The apparatus of claim 24, wherein the factor essentially corresponds to zero when the vehicle controller is not intervening, and the factor essentially corresponds to one when the vehicle controller is intervening.

29. The apparatus of claim 28, wherein the steering angle to be applied corresponds to a sum of the instantaneous compensation steering angle and the compensation steering angle maintained while the vehicle controller is intervening, wherein the first summand is weighted based on a number that is 1 minus the factor, and the second summand is weighted by the factor.

30. A device for operating a vehicle, comprising:

a vehicle controller configured to individually adjust braking forces of wheels of at least one axle of the vehicle;

a yawing moment compensator configured to at least partially compensate for a yawing moment of the vehicle resulting from different braking forces of individual wheels of the at least one axle by intervening in a steering of the vehicle by determining a steering angle to be applied at a steered axle based on an instantaneous compensation steering angle, a compensation steering angle maintained during an intervention by the vehicle controller, and based on the vehicle controller intervening; and a selector configured to one of prevent and reduce an action of the yawing moment compensator on the steering when the vehicle controller is adjusting braking forces.

31. The device of claim 30, wherein the vehicle intervention by the vehicle controller is represented by a factor having a value that depends on whether the vehicle controller is intervening.

32. The device of claim 31, wherein the factor is formed from a signal from the vehicle controller, wherein the signal represent whether the vehicle controller is intervening.

33. The device of claim 32, wherein the factor essentially corresponds to a first value when the vehicle controller is not intervening, and the factor essentially corresponds to another value when the vehicle controller is intervening.

34. The device of claim 33, wherein the steering angle to be applied corresponds to a sum of the instantaneous compensation steering angle and the compensation steering angle maintained while the vehicle controller is intervening, wherein each of the summands is weighted based on the factor.

35. The device of claim 31, wherein the factor essentially corresponds to zero when the vehicle controller is not intervening, and the factor essentially corresponds to one when the vehicle controller is intervening.

36. The device of claim 35, wherein the steering angle to be applied corresponds to a sum of the instantaneous compensation steering angle and the compensation steering angle maintained while the vehicle controller is intervening, wherein the first summand is weighted based on a number that is 1 minus the factor, and the second summand is weighted by the factor.

* * * * *